United States Patent [19]
Jung

[11] Patent Number: 6,034,833
[45] Date of Patent: *Mar. 7, 2000

[54] RECORD/REPRODUCTION CONTROLLING SIGNAL GENERATOR WITH AN ERROR PREVENTING CIRCUIT HAVING AN AUTOMATIC LEVEL CONTROL CIRCUIT

[75] Inventor: Deok-Young Jung, Incheon-Kwangyeoksi, Rep. of Korea

[73] Assignee: Samsung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/677,644

[22] Filed: Jul. 8, 1996

[30] Foreign Application Priority Data

Jul. 10, 1995 [KR] Rep. of Korea ............... 95-20173

[51] Int. Cl.[7] .................. G11B 5/02; G11B 5/09
[52] U.S. Cl. .............................. 360/67; 360/46
[58] Field of Search .................. 360/46, 61, 67, 360/69

[56] References Cited

U.S. PATENT DOCUMENTS

| | | | |
|---|---|---|---|
| 4,831,466 | 5/1989 | Murakami et al. | 360/67 |
| 4,991,034 | 2/1991 | Sato | 360/67 |
| 5,483,390 | 1/1996 | Jaffard et al. | 360/46 |
| 5,592,344 | 1/1997 | Tsuruoka | 360/66 |
| 5,790,331 | 8/1998 | Aranovsky | 360/46 |

OTHER PUBLICATIONS

Microelectronic Circuits, 3rd edition, Sedra et al, pp. 861–868, 1991.

*Primary Examiner*—Aristotelis M. Psitos
*Assistant Examiner*—Regina Y. Neal
*Attorney, Agent, or Firm*—Jones Volentine, L.L.P.

[57] ABSTRACT

A record/reproduction controlling signal generator with an error preventing circuit having an automatic level control circuit. The generator of the present invention is provided in a simple hardware form and is adapted to synchronize to a recording point in such a manner as to preclude transient phenomena that may occur when the power is first turned on to the device.

11 Claims, 3 Drawing Sheets

Switch-ON or Power-ON

Voltage fluctuation at point ①

Comparator output

RECORD/REPRODUCTION CONTROLLING SIGNAL GENERATOR WITH AN ERROR PREVENTING CIRCUIT HAVING AN AUTOMATIC LEVEL CONTROL CIRCUIT

BACKGROUND OF THE INVENTION

(1) Field of the Invention

The present invention relates to a record/reproduction controlling signal generator with an error preventing circuit having an automatic level control (ALC) circuit. More particularly, the above generator with an error preventing circuit has an automatic level control (ALC) circuit that is made up in the form of simple hardware and synchronizes to a recording point to preclude transient phenomena that may occur when the power to the device is turned on.

(2) Description of the Prior Art

Referring now to the drawings, a conventional automatic level control (ALC) circuit may be described as follows. FIG. 1 is a circuit diagram showing a conventional automatic level control (ALC) circuit. This circuit includes an attenuator 10 that receives and attenuates a recording signal to reproduce it; an amplifier 20 that receives the signal produced from the attenuator 20, then amplifies and reproduces the signal; a comparator 30 that receives the recording signal produced from the amplifier 20 through a non-inverting (+) input terminal and a predetermined reference voltage Vr through an inverting (−) terminal, where the comparator 30 compares the two input signals to produce a detecting signal; a capacitor C1 that charges or discharges the detecting signal produced from the comparator 30 and converts the signal into a direct current to transmit it to the attenuator as attenuating data; a switch SW 60 that connects an output terminal of the comparator 30 to a ground, and where the switch SW 60 also protects the circuit by discharging the abnormal voltage that may occur by transient phenomena when the power is first turned on; an error preventing circuit 40 which is made up of a delay circuit for determining a turn-on time of the switch SW 60; and a record/reproduction controlling signal generating circuit 50 that receives a record/reproduction controlling signal through an external switch labelled in FIG. 1 as R/P SW 70.

The error preventing circuit 40 includes a capacitor C2 that charges voltage through the external voltage current source and determines the time for turning on of the switch SW 60. The circuit 40 also includes a delay circuit 41 that has the function of delaying the turn-on time for the switch SW 60 which is regulated by input from the capacitor C2.

In operation, the comparator 30 detects a signal which is over the reference voltage Vr in this conventional ALC circuit. The signal is converted into a direct current and transmitted as attenuating data to the attenuator 10 during the attenuation of the recording signal to reduce an input signal supplied by the attenuator 10 to the amplifier 20.

The conventional ALC circuit functions without any problems during times of normal operation. However, this ALC circuit generally creates an abnormal voltage at the output of the comparator 30, which is caused by the transient phenomena at the time when power is turned on. To avoid abnormal operation of the attenuator 10 caused by the high voltage of the capacitor C1, the ALC circuit is designed to discharge the voltage of the capacitor C1 at the transient edge by including the error preventing circuit 40.

As shown in FIG. 1, assigning an additional terminal to the circuit and then connecting it to the capacitor C2, which is a time delay means, is a simple way to form the error preventing circuit 40. It is common to use a capacitor that is necessary for another function to also provide this necessary function without resorting to the use of additional terminals and capacitors. The above-mentioned capacitor has the other function of being a ripple-removing filter of power that produces bias voltage or of being a direct current cut-off capacitor for a feedback terminal of an amplifier.

However, there is a time difference between the voltage rise of these terminals and the transient voltage rise of the recording amplifier. Therefore, the anomalous overcharge voltage is not fully discharged unless the delay circuit is designed with considerable precision.

Moreover, when it comes to circuit design, a semiconductor device is represented through simulation by means of a computer-aided design. However, the operation of a component in the computer-simulation of a circuit design is generally different from the actual operation of the circuit. Accordingly, the circuit is subject to frequent modifications of the design in actual practice.

SUMMARY OF THE INVENTION

It is an object of the present invention to provide a record/reproduction controlling signal generator with an error preventing circuit which includes an automatic level control (ALC) circuit that is provided in a simple hardware form, and which is adapted to synchronize to a recording point in such a manner as to preclude transient phenomena that may occur as a result of turning the power on to the circuit.

In order to achieve this object, the present invention comprises:

external selection switching means for selecting either a recording or reproducing operation;

a voltage/current source for applying voltage or current to the circuit when the power is turned on;

a resistance connecting the voltage/current source to a ground to change the current into voltage;

a comparator; and delay means connected in parallel to the resistance and adapted to delay the rise of voltage inputted to the comparator.

The comparator receives the voltage provided through the delay means via an inverting (−) input terminal and concurrently receives a predetermined reference voltage via a non-inverting (+) input terminal. It then compares the two inputted signals with each other to produce a record/reproduction controlling signal and to also provide a turn-on signal to an external selection switching means.

DETAILED DESCRIPTION OF THE PREFERRED EMBODIMENTS

Figure 2:
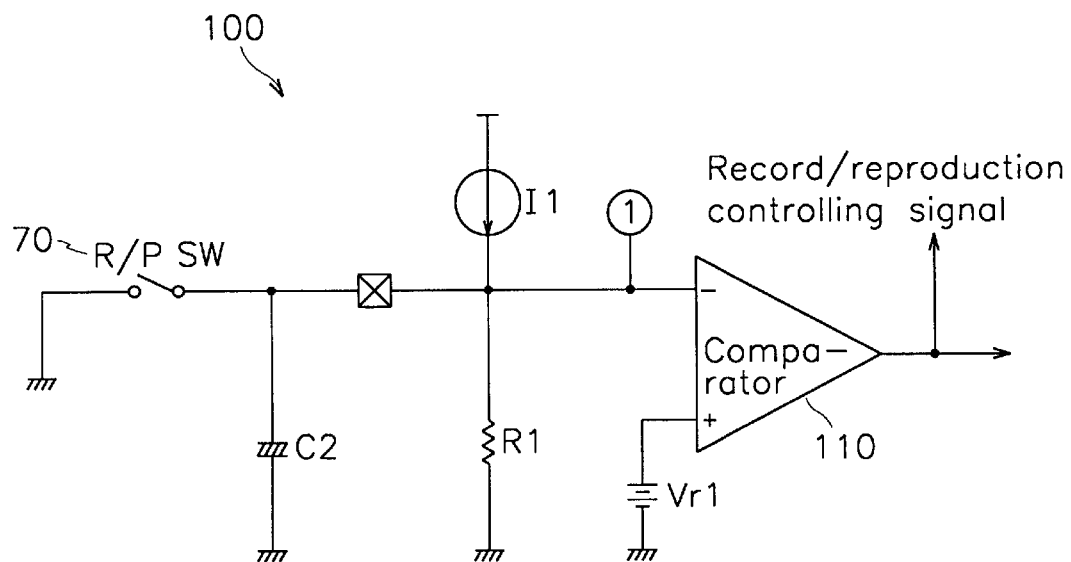
FIG. 2 is a circuit diagram of a record/reproduction controlling signal generator with an error preventing circuit which includes an automatic level control (ALC) circuit in accordance with a preferred embodiment of the present invention.
Figure 3A:
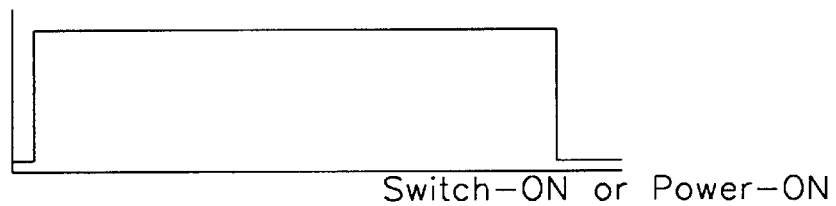
FIGS. 3A to 3C are timing charts of the record/reproduction controlling signal generator with an error preventing circuit which includes an automatic level control (ALC) circuit in accordance with the preferred embodiment of the present invention.
Figure 3B:
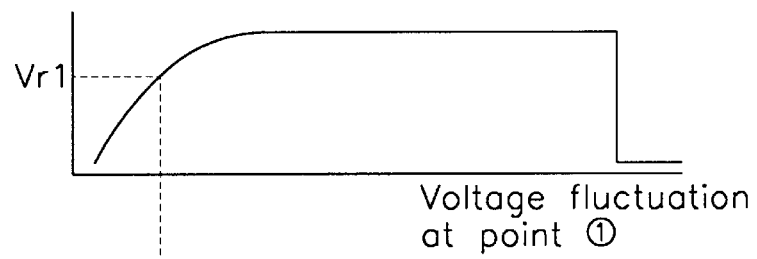
Figure 3C:
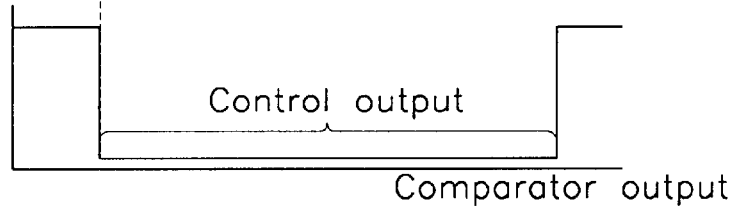
Figure 4:
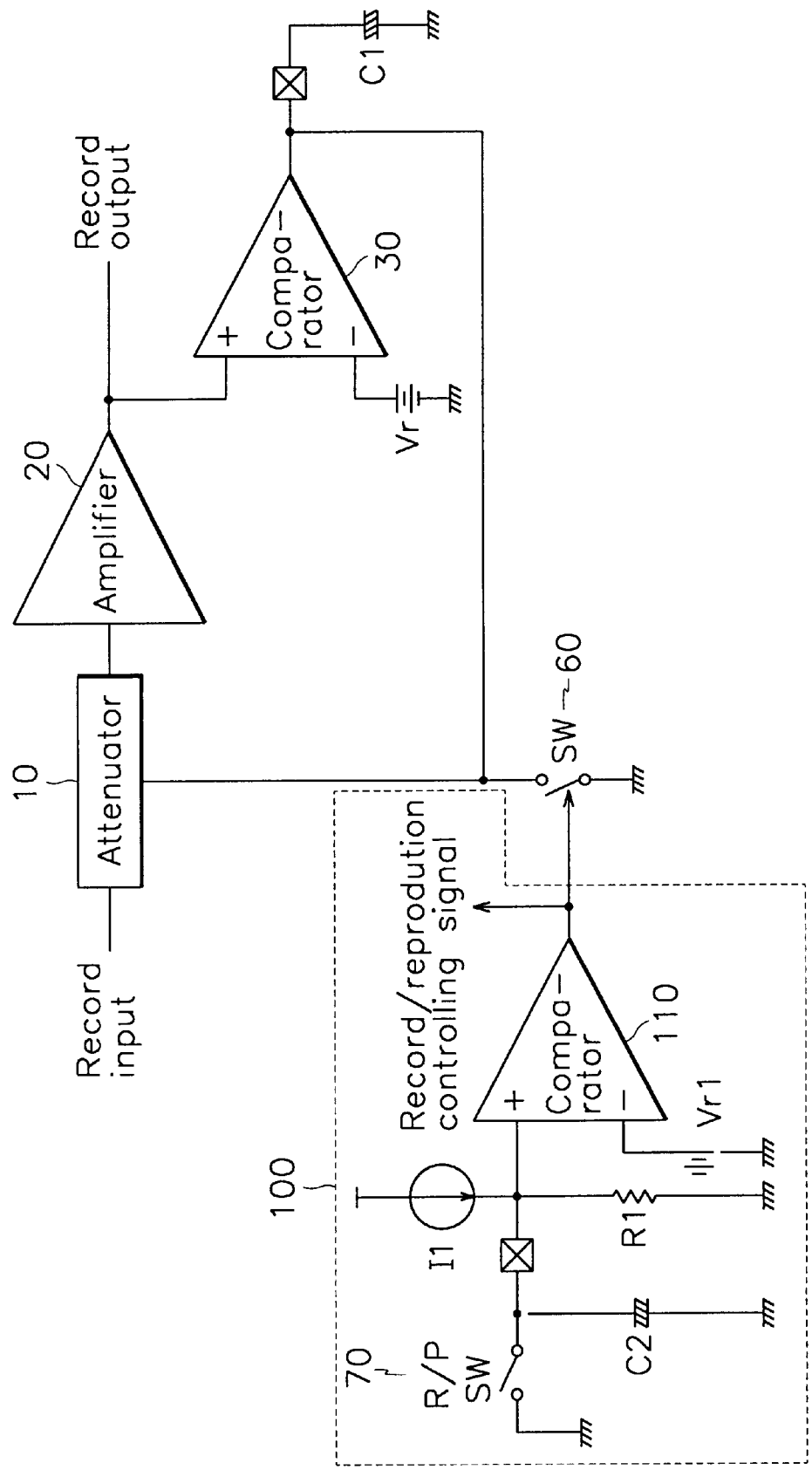
FIG. 4 is a circuit diagram of an automatic level control (ALC) circuit in accordance with the preferred embodiment of the present invention.

A preferred embodiment of the present invention is described by referring to FIGS. 2 to 4.

As shown in FIG. 2, the inventive record/production controlling signal generator with an error preventing circuit which comprises an automatic level control (ALC) circuit, includes an external selection switch R/P SW 70 that selects either a recording or reproducing operation, a voltage/current source I1 that applies voltage or current to the circuit when the power is turned on, and a resistance R1 that connects the voltage/current source I1 to a ground to change the current into voltage.

Moreover the inventive generator includes a capacitor C2 that is connected in parallel to the resistance R1, where capacitor C2 is adapted to delay the rise of voltage inputted to a comparator, and a comparator 110 that receives the voltage provided through the capacitor C2 via an inverting (−) input terminal and concurrently receives a predetermined reference voltage Vr1 in a non-inverting (+) input terminal. Whereupon, the comparator 110 compares the two inputted signals with each other to produce a record/reproduction controlling signal and also to provide a turn-on signal to a switch SW 60.

The following description relates to the operation of the record/reproduction controlling signal generator with an error preventing circuit comprising an ALC circuit in accordance with a preferred embodiment of the present invention.

FIG. 2 is a circuit diagram of the inventive record/reproduction controlling signal generator with an error preventing circuit comprising a control (ALC) circuit. Since the operation of the AlC circuit is defined just at the time of recording, the description thereof herein is focused upon the operation of the circuit at the time of recording.

The external selection switch R/P SW 70 selects a recording or reproducing operation and is a record/reproduction controlling means that a user may define.

As mentioned above, the most serious transient phenomena is generated in the ALC circuit when the power is first turned on.

Initially, at the time when the switch R/P SW 70 is opened the circuit is set at a recording mode. Thus, when the power is applied and current flows by the voltage/current source I1, the voltage that is provided to the comparator 110 by the resistance R1 is a voltage converting means and the capacitor C2 that is a delay means, gradually rises. The waveform of such a voltage rise (at point 1 in FIG. 2) is depicted in FIG. 3B.

When voltage that is more than the reference voltage Vr1 which has been set to be a predetermined value lower than a final rising value, is inputted as input voltage, the output of the comparator 110 has a waveform as shown in FIG. 3C.

Figure 1:
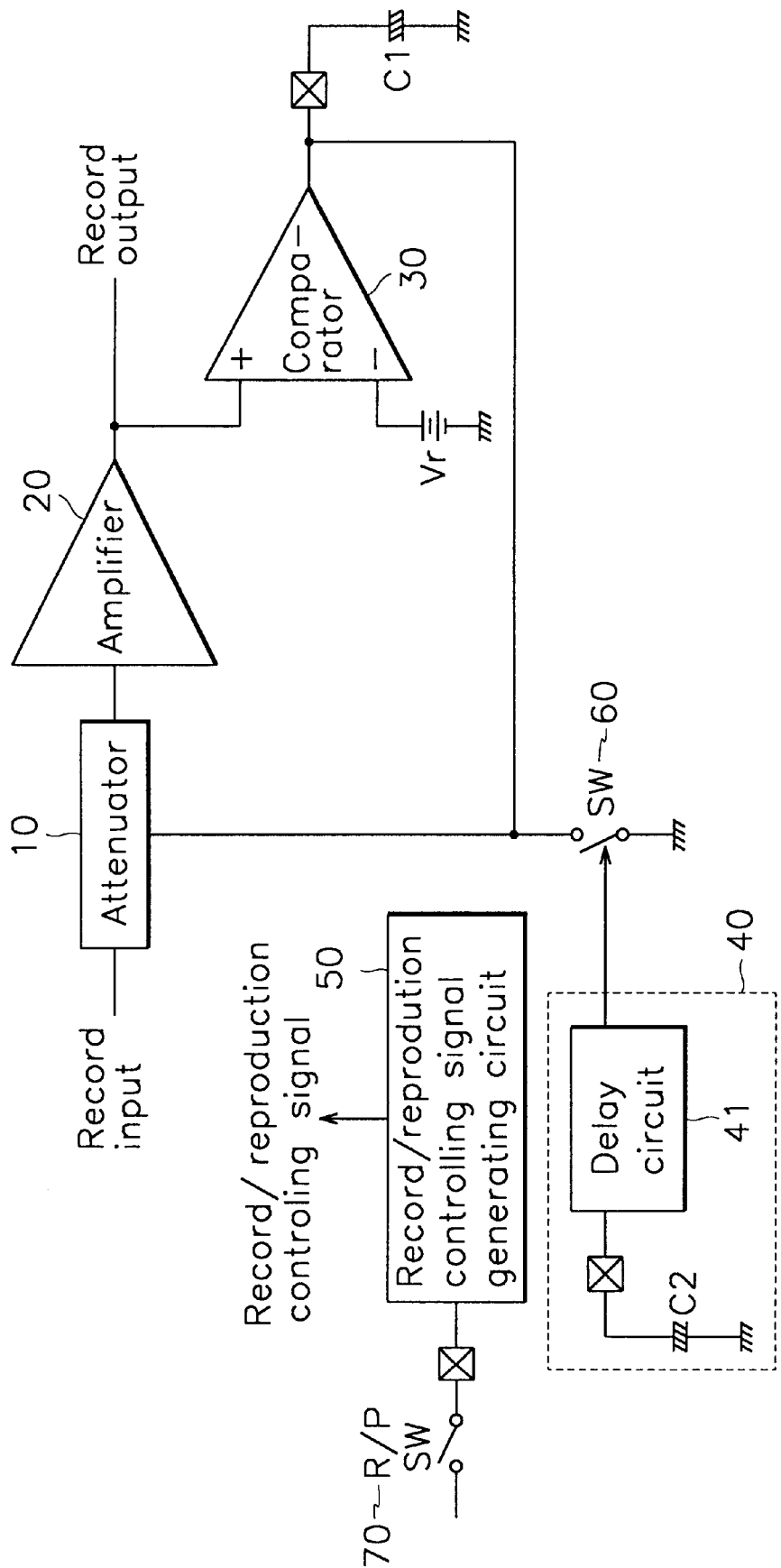
FIG. 1 is a circuit diagram of a conventional automatic level control (ALC) circuit.

FIG. 4 is a circuit diagram of an automatic level control (ALC) circuit in accordance with a preferred embodiment of the present invention. According to the preferred embodiment of the present invention, there is a record/reproduction controlling signal generator 100 with an error preventing circuit adapted to provide an automatic level control circuit which incorporates the record/reproduction controlling signal generating circuit 50 (as shown in FIG. 1) and the error preventing circuit 40 (also shown in FIG. 1).

At the edge where a control output of the comparator 110 is produced, the switch SW 60 for protecting the above circuit is turned on, and the voltage of the capacitor C1 shown in FIG. 4 is discharged. Such a circuit is adapted to prevent an erroneous operation caused by the abnormal voltage produced when the power is initially turned on to the circuit by using the control output of the comparator 110 as a record/reproduction controlling output as well.

As already mentioned above, since the ALC circuit of the present invention is formed of one circuit which incorporates both the elements of record/reproduction controlling signal generating circuit 50 (shown in FIG. 1) and the error preventing circuit 40 (shown in FIG. 1) that make up the conventional ALC circuit, an ALC circuit is provided with a simple structure. Such is accomplished without adding external terminals and yet the ALC circuit is synchronized to a recording point.

When the reproduction mode is changed into a recording mode after the circuit has attained its normal operation voltage conditions, the circuit carries out the same operation as that when the power is first applied thereto. Thus, an abnormal operation caused by switching to a recording mode may be prevented.

While this invention has been described with respect to that which is presently considered to be the most practical and preferred embodiments, it is to be understood that the invention is not limited to the disclosed embodiments. On the contrary, it is intended that the present invention cover various modifications and equivalent arrangements within the spirit and scope of the appended claims.

What is claimed is:

1. A record/reproduction controlling signal generator with an error preventing circuit having an automatic level control circuit, comprising:

an external selection switching means for selecting either a recording or reproducing operation;

a current source for applying a current to the circuit when the power is turned on;

a resistance connecting the current source to a ground to change the current into a voltage;

a delay means connected in parallel to the resistance adapted for raising the voltage slowly for a delay time;

a comparator whose first input terminal receives the voltage from the delay means and whose second input terminal receives a predetermined reference voltage, the comparator being a means for comparing the voltage from the delay means with the predetermined reference voltage to produce a record/reproduction controlling signal.

2. The record/reproduction controlling signal generator with an error preventing circuit having an automatic level control circuit as defined in claim 1, wherein said delay means is formed by a capacitor adapted to have a time constant for charging or discharging voltage.

3. The record/reproduction controlling signal generator as defined in claim 1, wherein the comparator further provides a turn-on signal for a second switching means.

4. The record/reproduction controlling signal generator as defined in claim 1, wherein the first input terminal of the comparator is an inverting (−) input terminal and the second input terminal is a non-inverting (+) input terminal.

5. The record/reproduction controlling signal generator as defined in claim 1, wherein the first input terminal of the comparator is a non-inverting (+) input terminal and the second input terminal is an inverting (−) input terminal.

6. An automatic level control circuit comprising:

a record/reproduction controlling signal generator with an error preventing circuit having an automatic level control circuit, comprising:

an external selection switching means for selecting either a recording or reproducing operation;

a current source for applying a current to the circuit when the power is turned on;

a resistance connecting the current source to a ground to change the current into a voltage;

a delay means connected in parallel to the resistance adapted for raising the voltage slowly for a delay time; and a first comparator whose first input terminal receives the voltage from the delay means and whose second input terminal receives a predetermined reference voltage, the first comparator being a means for comparing the voltage from the delay means with the predetermined reference voltage to produce a turn-on signal;

an attenuator receiving an external recording signal via an input terminal and attenuating the external recording signal to produce an attenuated signal;

an amplifier for receiving and amplifying the attenuated signal from the attenuator to produce an amplifying signal;

a second comparator having a first terminal receiving the amplifying signal from the amplifier and having a second terminal receiving a predetermined reference voltage, the second comparator operating to compare the amplifying signal with the predetermined reference voltage to produce a detecting signal at an output terminal;

a first capacitor connected to the output terminal for charging or discharging the detecting signal to convert the detecting signal into a direct current signal, and for transmitting the direct current signal to the attenuator as attenuating data; and a second switching means for initially connecting the output terminal to ground to discharge the first capacitor and for disconnecting the output terminal from ground in response to the turn-on signal to allow the direct current signal to pass to the attenuator.

7. The automatic level control circuit of claim 6, wherein the delay means is formed by a second capacitor adapted to have a time constant for charging or discharging voltage.

8. The automatic level control circuit of claim 6, wherein the first input terminal of the first comparator is an inverting (−) input terminal and the second input terminal is a non-inverting (+) input terminal.

9. The automatic level control circuit of claim 6, wherein the first input terminal of the first comparator is a non-inverting (+) input terminal and the second input terminal is an inverting (−) input terminal.

10. The automatic level control circuit of claim 6, wherein the first input terminal of the second comparator is an inverting (−) input terminal and the second input terminal is a non-inverting (+) input terminal.

11. The automatic level control circuit of claim 6, wherein the first input terminal of the second comparator is a non-inverting (+) input terminal and the second input terminal is an inverting (−) input terminal.

* * * * *